(12) United States Patent
Tubb et al.

(10) Patent No.: US 12,263,954 B2
(45) Date of Patent: Apr. 1, 2025

(54) MUFFLER

(71) Applicant: ORBITAL AUSTRALIA PTY LTD, Balcatta (AU)

(72) Inventors: John Howard Tubb, Befordale (AU); Pouria Mehrani, Darch (AU); Christian Chandrakumar Zavier, Morley (AU); Mario Charles Muscat, Ballajura (AU); Gary John Bone, Hocking (AU); Trenton John Harvey, Scarborough (AU)

(73) Assignee: Orbital Australia Pty Ltd, Balcatta (AU)

( * ) Notice: Subject to any disclaimer, the term of this patent is extended or adjusted under 35 U.S.C. 154(b) by 369 days.

(21) Appl. No.: 17/631,456

(22) PCT Filed: Jul. 30, 2020

(86) PCT No.: PCT/AU2020/050783
§ 371 (c)(1),
(2) Date: Jan. 29, 2022

(87) PCT Pub. No.: WO2021/016669
PCT Pub. Date: Feb. 4, 2021

(65) Prior Publication Data
US 2022/0274714 A1    Sep. 1, 2022

(30) Foreign Application Priority Data
Jul. 30, 2019    (AU) ................................ 2019902719

(51) Int. Cl.
*F02K 1/34*    (2006.01)
*B64D 33/04*   (2006.01)
(Continued)

(52) U.S. Cl.
CPC ............... *B64D 33/06* (2013.01); *F01N 1/08* (2013.01); *F01N 1/083* (2013.01); *B64U 20/20* (2023.01); *B64U 50/11* (2023.01)

(58) Field of Classification Search
CPC ...... F01N 1/083; F01N 1/084; F01N 13/1872; F01N 13/1877; F01N 2470/08
(Continued)

(56) References Cited

U.S. PATENT DOCUMENTS

| 701,496   | A | * | 6/1902 | McKinnie | B01D 46/10 |
|           |   |   |        |          | 96/381     |
| 1,055,708 | A | * | 3/1913 | Case     | A61F 7/00  |
|           |   |   |        |          | 126/204    |

(Continued)

FOREIGN PATENT DOCUMENTS

| EP | 0778399 B1 | 6/2002 |
| FR | 1230583 A  | 9/1960 |

(Continued)

OTHER PUBLICATIONS

International Search Report and Written Opinion of the International Search Authority, issued in PCT/AU2020/050783, mailed Oct. 9, 2020; ISA/AU.

(Continued)

*Primary Examiner* — Jeremy A Luks
(74) *Attorney, Agent, or Firm* — Harness, Dickey & Pierce, PLC (57) ABSTRACT

A compact muffler (40) for an engine exhaust system, which is particularly applicable for use with small, reciprocating piston two-stroke engines of the type used on unmanned aerial vehicles (UAVs). The compact muffler (40) comprises an exhaust gas flow path (67) between an inlet (61) and an outlet (63). The exhaust gas flow path (67) comprises a plurality of adjacent flow passages (65), wherein at least two (Continued)

of the adjacent flow passages (65) are fluidly connected in series to enable the flow of exhaust gas from one to the other along the flow path (67). The adjacent flow passages (65) are configured for fluid flow therealong in opposed directions. A bypass passage (70) is provided between the two adjacent flow passages (65) for further communication between the two flow passages and to promote an equalisation of fluid pressure within the two adjacent passages (65). A UAV having an internal combustion engine (31) fitted with an exhaust system comprising the compact muffler (40) is also disclosed.

23 Claims, 4 Drawing Sheets

(51) Int. Cl.
  *F01N 1/08* (2006.01)
  *B64U 20/20* (2023.01)
  *B64U 50/11* (2023.01)
(58) Field of Classification Search
  USPC .......................................................... 181/265
  See application file for complete search history.

(56) References Cited

U.S. PATENT DOCUMENTS

| | | | |
|---|---|---|---|
| 1,584,215 A * | 5/1926 | Clawson | F01N 1/14 |
| | | | 181/263 |
| 1,998,386 A * | 4/1935 | Powell | F01N 1/003 |
| | | | 181/270 |
| 3,168,162 A | 2/1965 | Clary et al. | |
| 3,220,507 A * | 11/1965 | Jettinghoff | F01N 13/185 |
| | | | 29/516 |
| 3,370,674 A * | 2/1968 | Jettinghoff | F01N 1/06 |
| | | | 181/265 |
| 3,590,947 A * | 7/1971 | Latch | F01N 1/12 |
| | | | 181/265 |
| 3,741,336 A | 6/1973 | Malosh | |
| 3,966,015 A * | 6/1976 | Bychinsky | F01N 1/06 |
| | | | 181/268 |
| 4,953,660 A * | 9/1990 | Jewell, Jr. | F01N 13/1872 |
| | | | 181/266 |
| 5,123,502 A | 6/1992 | Flugger | |
| 5,773,770 A | 6/1998 | Jones | |
| 5,959,263 A | 9/1999 | Foltz, Jr. | |
| 5,984,045 A | 11/1999 | Maeda et al. | |
| 6,173,808 B1 | 1/2001 | Maeda et al. | |
| 6,364,054 B1 * | 4/2002 | Bubulka | F01N 1/083 |
| | | | 181/282 |
| 7,793,758 B2 * | 9/2010 | Rimback | F01N 1/02 |
| | | | 181/282 |
| 8,256,571 B1 * | 9/2012 | Butler | F01N 1/083 |
| | | | 181/275 |
| 8,746,401 B2 * | 6/2014 | Butler | F01N 1/08 |
| | | | 181/275 |
| 10,344,660 B1 * | 7/2019 | Harris | F01N 1/04 |
| 2008/0302598 A1 | 12/2008 | Nicolai et al. | |
| 2009/0211841 A1 | 8/2009 | Bagheri | |
| 2012/0305330 A1 | 12/2012 | Kainuma | |
| 2013/0168183 A1 * | 7/2013 | Harris | F01N 1/24 |
| | | | 181/256 |

FOREIGN PATENT DOCUMENTS

| | | | | |
|---|---|---|---|---|
| WO | WO-92/04533 A1 | 3/1992 | | |
| WO | WO-2016201489 A1 * | 12/2016 | | F01N 1/003 |
| WO | WO-2018185538 A1 | 10/2018 | | |

OTHER PUBLICATIONS

International Preliminary Report on Patentibility for PCT/AU2020/050783, mailed Dec. 3, 2021.
Second Written Opinion for PCT/AU2020/050783, mailed Nov. 25, 2021.

* cited by examiner

MUFFLER

CROSS-REFERENCE TO RELATED APPLICATIONS

This application is a 371 U.S. National Phase of International Application No. PCT/AU2020/050783, filed Jul. 30, 2020, which claims priority to Australian Patent Application No. 2019902719, filed Jul. 30, 2019. The entire disclosures of the above applications are incorporated herein by reference. TECHNICAL FIELD This invention relates to a muffler for an internal combustion engine to reduce engine noise emissions.

The invention relates more particularly, although not exclusively, to a muffler intended for use with internal combustion engines, particularly reciprocating piston engines, operable using heavy fuels (for example military and aviation fuels such as JP-5 and JP-8).

The invention is particularly applicable as a compact muffler for use with small, reciprocating piston two-stroke engines of the type used on unmanned aerial vehicles (UAVs). Accordingly, it will be convenient to hereinafter describe the invention in relation to that exemplary application. However, it is to be appreciated that the invention can of course have other applications; for example, it may be used in relation to other types of vehicle, and also on other internal combustion engines as appropriate.

BACKGROUND ART

The following discussion of the background art is intended to facilitate an understanding of the present invention only. The discussion is not an acknowledgement or admission that any of the material referred to is or was part of the common general knowledge as at the priority date of the application.

There is often a requirement for a muffler intended for use with internal combustion engines of vehicles such as UAVs, to be of compact and relatively lightweight construction. This can be particularly so for an engine of a UAV, where there are likely to be space and weight constraints within the UAV fuselage.

Reciprocating piston two-stroke engines are typically regarded as being engines which output significant noise, this noise arising from the propagation and radiation of acoustic pulses generated by the gas flow resulting from the combustion process. For certain applications of such engines, including for an engine of a UAV, there may be a need for compliance with certain regulations, standards or specific user requirements regarding the level of noise emitted by the engine. Thus, there may be a need for control of engine exhaust noise through suppression of the acoustic pulses generated by the engine. This is typically done by way of acoustic quieting on the exhaust side of the engine.

However, reciprocating piston two-stroke engines can be sensitive to what is arranged on the exhaust side of the engine for the purpose of acoustic quieting. More particularly, there is a need for an appropriate level of backpressure to be imposed upon the exhaust flow from a combustion chamber of a reciprocating piston two-stroke engine to inhibit escape of the air/fuel mixture introduced into the combustion chamber prior to closing of an exhaust outlet port. Excessive backpressure can, however, be detrimental to engine performance. Furthermore, engine efficiency and performance can be improved where the geometry of the exhaust system is carefully designed or selected to reflect pressure waves from the exhaust port back to the port at a particular time in the engine operating cycle providing a tuned exhaust system.

Accordingly, there may be various functional requirements of a muffler in order for it to be suitable for a reciprocating piston two-stroke engine of a UAV.

It is against this background that the present invention has been developed. However, it should be understood that the invention need not be limited to a muffler for a reciprocating piston engine operable using heavy fuel or a reciprocating piston two-stroke engine of a UAV. The muffler may, for example, find application in relation to other engines, including four-stroke engines. The muffler may also find application in relation to internal combustion engines for other vehicles or apparatus, including for example hand-held tools such as chainsaws, as well as stationary engines.

SUMMARY OF INVENTION

According to a first aspect of the invention there is provided a compact muffler for an engine exhaust system comprising an exhaust gas flow path between an inlet and an outlet, the exhaust gas flow path comprising a plurality of adjacent flow passages, wherein at least two of the adjacent flow passages are fluidly connected in series to enable the flow of exhaust gas from one to the other along the flow path, the adjacent flow passages also being configured for fluid flow therealong in opposed directions, and wherein a bypass passage is provided between the two adjacent flow passages for further communication between the two flow passages and to promote an equalisation of fluid pressure within the two adjacent passages.

The bypass passage effectively joins the two flow passages and provides for short-circuiting of the exhaust gas flow path which serves to promote the equalisation of fluid pressure within the two side by side passages.

The bypass passage may open onto the respective flow passage in a direction laterally of fluid flow along the respective flow passage. More particularly, each flow passage may be bounded by a side wall and the bypass passage may open onto the respective flow passage through the side wall.

The two adjacent flow passages may be disposed directly adjacent one another. More particularly, the two flow passages may be neighbouring flow passages.

The two neighbouring flow passages may be separated by a common wall. With this arrangement, the bypass passage between the two neighbouring flow passages opens laterally at one end onto one flow passage and opens laterally at an opposed end onto the other flow passage.

The bypass passage may comprise an opening in the common wall between the two neighbouring flow passages. The opening may comprise a circular opening, although other configurations are contemplated including rectangular openings and rounded slots.

There may be at least one further bypass passage between the two adjacent flow passages for further communication between the two flow passages. In other words, there may be a plurality of bypass passages between the two adjacent flow passages. The bypass passages may be spaced at intervals along the common wall between the two neighbouring flow passages.

The exhaust gas flow path may comprise three or more of the flow passages which are fluidly connected in series.

The geometry and overall length of the series of flow passages may be selected to facilitate specific exhaust tuning requirements for the engine. In an arrangement provided for a small two-stroke engine for a UAV, an exhaust flow path defined by the series of flow passages may be selected to provide desired engine tuning for a specific rpm or rpm range.

Where the exhaust gas flow path comprises three or more of the flow passages, the flow passages may be arranged in pairs such that there is at least one of the bypass passages between the two flow passages in each pair. Where the flow passages are arranged in pairs, there may be one flow passage which is common to two pairs. By way of explanation, in an arrangement comprising three flow passages, there may be two pairs, with one of the three flow passages being common to each pair.

In one arrangement, the exhaust gas flow path comprises a first flow passage with which the inlet communicates, and a plurality of further flow passages arranged in series with the first flow passage, wherein there are bypass passages associated with all adjacent flow passage pairs.

In all cases, each bypass passage joins two of the adjacent flow passages, promoting an equalisation of fluid pressure within those two passages.

In the case of a particular flow passage which is bound by two adjacent side walls each having one or more openings to provide bypass passages, the locations of the openings providing the bypass passages in the two side walls may be offset.

In an arrangement in which there are a plurality of the flow passages and a plurality of the bypass passages, pressurisation of the overall muffler volume provided by the series of flow passages is able to occur more rapidly. With the bypass passages promoting equalisation of fluid pressure within the various flow passages, the resulting mass of exhaust gas within the overall exhaust gas flow path (i.e. within the overall muffler volume) is in effect a gaseous body which is resiliently compressible and which is contained within the gas flow path. Incoming exhaust gas entering the exhaust gas flow path through the muffler inlet confronts and integrates with the gaseous body, and a corresponding quantity of exhaust gas is displaced from the exhaust gas flow path, leaving the gaseous body and being discharged through the muffler outlet. However, because the gaseous body is resiliently compressible, it is able to expand and contract when subjected to exhaust pressure fluctuations, thereby acting as a damper to reduce acoustic pressure fluctuations in the exhaust gas flow and abate associated noise.

The muffler may further comprise a compact body configured to define the inlet, the outlet, and the exhaust gas flow path comprising the plurality of adjacent flow passages.

The compact body may comprise a casing defining an interior chamber, wherein there are portions within the interior chamber defining internal walls between the flow passages. The internal walls partition the interior chamber to define the plurality of adjacent flow passages and thus the exhaust gas flow path.

The casing may be configured as a shell having a two-part construction. More particularly, the shell may comprise first and second shell parts which are adapted to be assembled together to define the interior chamber into which the muffler inlet and muffler outlet each open.

The first and second shell parts may have mating marginal edges adapted to abut and sealingly close the interior chamber.

Either one or both of the first and second shell parts may incorporate partition elements such as ribs to define the internal walls within the interior chamber, the internal walls being in spaced apart relation to define the flow passages therebetween. The partition elements may be integrated in the shell parts or configured as detachable elements such as inserts.

At least one of the internal walls may contain one or more recesses arranged therealong to define one or more respective bypass passages located to provide fluid communication between the two adjacent flow passages separated by the at least one internal wall.

Where both of the first and second shell parts incorporate partition elements, each partition element on one shell part may have an edge adapted to abut an edge of a counterpart partition element on the other shell part, with the two partition elements having recesses which extend to the respective edges, whereby the two recesses cooperate to define a respective bypass passage when the two partition elements are in abutting relation.

The muffler body is preferably configured to present a compact profile which facilitates its application for and installation on a UAV engine.

The body may have a first end section and a second end section, the first end section being adapted for mounting onto an engine with the interior chamber in communication with an exhaust outlet of the engine to receive exhaust flow therefrom. This arrangement provides for a connection between the inlet of the muffler and the exhaust outlet of the engine, whereby exhaust flow from the exhaust outlet is delivered to the exhaust gas flow path within the muffler.

The muffler body may be elongate; that is, it may have a longitudinal extent between the first and second end sections.

The muffler body may present an outer surface. The outer surface may be arcuate in its longitudinal direction.

According to a second aspect of the invention there is provided an internal combustion engine fitted with an exhaust system comprising a compact muffler according to the first aspect of the invention.

According to a third aspect of the invention there is provided a vehicle having an internal combustion engine fitted with an exhaust system comprising a compact muffler according to the first aspect of the invention.

The vehicle according to the third aspect of the invention may comprise an exterior surface and the muffler may present an outer surface coincident with or recessed with respect to the exterior surface of the vehicle. With this arrangement, the outer surface of the muffler may be exposed to airflow during motion of the vehicle.

The vehicle according to the third aspect of the invention may comprise a UAV.

According to a fourth aspect of the invention there is provided a UAV comprising a fuselage presenting an exterior surface, and an internal combustion engine fitted with an exhaust system comprising a compact muffler, wherein the muffler presents an outer surface coincident with or recessed with respect to the exterior surface of the fuselage, and wherein the muffler is in accordance with the first aspect of the invention.

The fuselage may at least in part be generally cylindrical, with the exterior surface at the cylindrical part being curved in cross-section.

Where the muffler body is elongate and configured to be arcuate in the longitudinal direction, the curvature of the arcuate outer surface of the muffler may conform generally to the cross-sectional curvature of the fuselage. With this arrangement, the muffler may be disposed crosswise within the fuselage, with the curved outer surface of the muffler being coincident with or recessed with respect to the curved exterior surface of the fuselage.

According to a further aspect of the invention there is provided a compact muffler for an engine exhaust system; the compact muffler comprising a casing defining an interior chamber, the casing providing a muffler inlet through which exhaust gas from an engine can directly enter the interior chamber, and a muffler outlet through which exhaust gas can exit the muffler directly from the interior chamber, the interior chamber providing a single exhaust gas flow path between the muffler inlet and the muffler outlet, the casing providing at least one internal wall therein, wherein at least one end of the at least one internal wall terminates a distance from a peripheral sidewall of the casing, the at least one internal wall incorporating one or more openings therein to define one or more bypass passages, the at least one internal wall being positioned between the muffler inlet and the muffler outlet to present a plurality of flow passages whereupon entering the interior chamber through the muffler inlet, the exhaust gas can pass through one of the plurality of flow passages before exiting the muffler through the muffler outlet directly from the interior chamber.

Preferably the at least one internal wall has the one end which terminates a distance from the peripheral sidewall and another end which extends from the peripheral sidewall.

The at least one internal wall may extend along a longitudinal extent of the casing.

The casing may provide a first internal wall and a second internal wall therein, the first internal wall extends from a first portion of the peripheral sidewall which is adjacent the muffler inlet and terminates a distance from a second portion of the peripheral sidewall, the second portion being opposed to the first portion, the second internal wall extends from a third portion of the peripheral sidewall which is adjacent the muffler outlet and terminates a distance from a fourth portion of the peripheral sidewall, the fourth portion being opposed to the third portion.

According to a further aspect of the invention there is provided a compact muffler for an engine exhaust system comprising a single gas flow path between an inlet and an outlet, the exhaust gas flow path is provided by an interior chamber of a casing of the muffler, the casing providing at least one internal wall extending from a peripheral sidewall of the casing and terminating within the confines of the interior chamber, the at least one internal wall defining a plurality of adjacent flow passages within the interior chamber, wherein adjacent flow passages are fluidly connected in series to enable the flow of exhaust gas from one to the other along the flow path, the adjacent flow passages also being configured for fluid flow therealong in opposed directions, the at least one internal wall incorporating at least one opening therein which defines at least one bypass passage between the adjacent flow passages for further communication between the flow passages and to promote an equalisation of fluid pressure within the two adjacent passages.

According to a further aspect of the invention there is provided a compact muffler for an engine exhaust system, the compact muffler comprising a single interior chamber having a fixed volume, the interior chamber are in direct fluid communication with a muffler inlet and a muffler outlet, the interior chamber provides a single gas flow path extending between the muffler inlet and the muffler outlet whereby gas entering the chamber through the muffler inlet travels along the single gas flow path before exiting through the muffler outlet, the chamber incorporates at least one internal wall extending from a sidewall of the chamber and terminating a distance short of a further sidewall of the chamber, the at least one internal wall forms the single gas flow path whereby the single gas flow path is formed from at least two flow passages, Wherein the at least two flow passages are arranged so that the single gas flow path utilises the entire volume provided by the chamber.

According to a further aspect of the invention there is provided a compact muffler for an engine exhaust system, the compact muffler comprising a single interior chamber having a fixed volume, a muffler inlet which opens directly into the single interior chamber such that exhaust gas from an engine can directly enter the interior chamber, and a muffler outlet which opens directly into the interior chamber and through which exhaust gas can exit the muffler directly from the interior chamber, the interior chamber providing a single gas flow path between the muffler inlet and the muffler outlet, the interior chamber having at least one internal wall therein to divide the single gas flow path into at least two flow passages, wherein at least one end of the at least one internal wall terminates a distance from a sidewall of the interior chamber, the at least one internal wall incorporating one or more openings therein to define one or more bypass passages, whereupon exhaust gas entering the interior chamber through the muffler inlet, the exhaust gas can pass through each of the at least two flow passages before exiting the muffler through the muffler outlet directly from the interior chamber.

Preferably the inlet is orientated such that the exhaust gas from the engine enters the chamber in a direction which substantially aligns with the longitudinal extent of a first flow passage of the plurality of flow passages.

Preferably each of the plurality of flow passages extends across the length or the width of the chamber.

BRIEF DESCRIPTION OF THE DRAWINGS

Further features of the present invention are more fully described in the following description of a non-limiting embodiment thereof. This description is included solely for the purposes of exemplifying the present invention. It should not be understood as a restriction on the broad summary, disclosure or description of the invention as set out above. The description will be made with reference to the accompanying drawings in which.

In the drawings like structures are referred to by like numerals throughout the several views. The drawings shown are not necessarily to scale, with emphasis instead generally being placed upon illustrating the principles of the present invention.

The figures depict an embodiment of the invention. The embodiment illustrates a particular configuration; however, it is to be appreciated that the invention can take the form of many configurations, as would be obvious to a person skilled in the art, whilst still embodying the present invention. These configurations are to be considered within the scope of this invention.

DESCRIPTION OF EMBODIMENT

In the following detailed description, the present invention is described in connection with a preferred embodiment. However, to the extent that the following description is specific to a particular embodiment or a particular use of the present techniques, it is intended to be illustrative only and merely provides a concise description of the exemplary embodiment. Accordingly, the present invention is not limited to the specific embodiments described below, but rather the invention includes all alternatives, modifications, and equivalents falling within the true scope of the appended claims.

Figure 1:
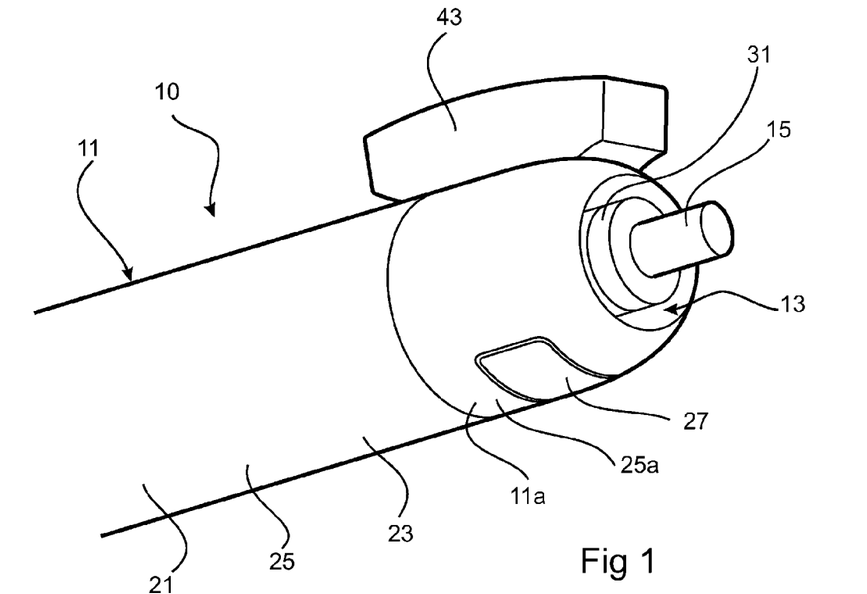
FIG. 1 is a fragmentary perspective view of an embodiment featuring a UAV, illustrating a rear end section of the fuselage.
Figure 2:
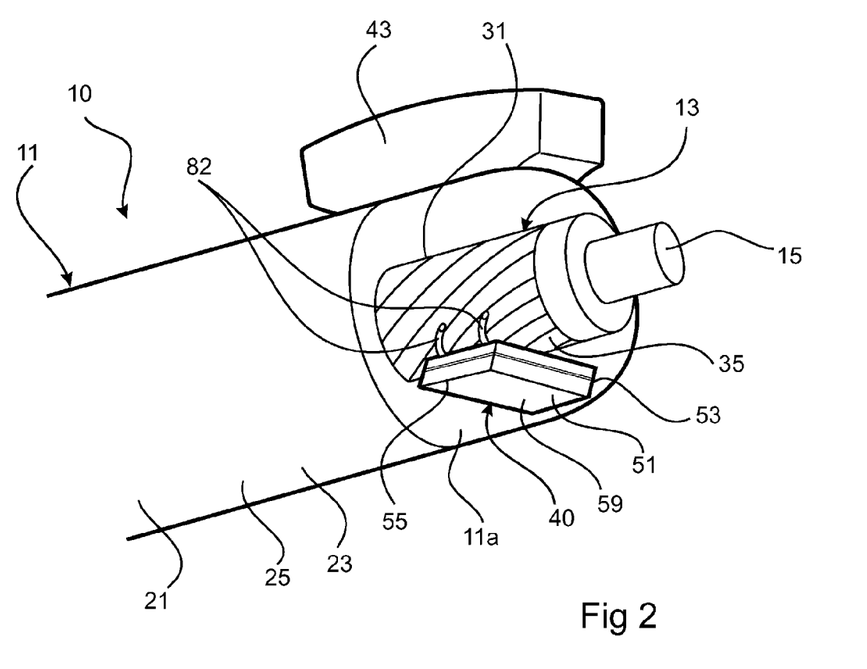
FIG. 2 is a view similar to FIG. 1, but with skin sections and parts removed to reveal an engine system of the UAV.

Referring to FIGS. 1 and 2, there is shown a UAV 10 comprising a fuselage 11 and an engine system 13 for driving a propulsion unit (not shown). In this embodiment, the propulsion unit is of a pusher configuration, comprising a rearward facing propeller (not shown). The propeller is adapted to be mounted on hub 15 to which the engine system 13 is drivingly connected. With this arrangement, the engine system 13 is accommodated within a rear end section 11a of the fuselage 11, forward of the propeller. The UAV 10 is not shown in its entirety in the drawings, but the general features of the fuselage 11 and engine system 13 referred to above would be well understood by a person skilled in the art.

The fuselage 11 comprises an outer skin 21 defining an exterior surface 23. In the arrangement shown, the outer skin 21 comprises a plurality of skin sections 25 which are selectively removable to provide access to interior parts of the fuselage 11. The skin sections 25 include skin section 25a disposed about the engine system 13 at rear end section 11a of the fuselage 11. In FIG. 2, the skin section 25a is removed to reveal the engine system 13. The skin section 25a includes an opening fitted with a curved cover 27, the purpose of which will be explained later.

The rear end section 11a of the fuselage 11 is generally cylindrical and the exterior surface 23 of the rear end section 11a is generally curved in cross-section.

The engine system 13 comprises an engine 31 which in this embodiment is in the form of a small, single-cylinder reciprocating piston two-stroke engine. The engine system 13 further comprises an array (not shown) of ancillary components for operation of the engine 31, including provision for delivery of a combustible mixture to the engine 31, and a control system for controlling ignition and operation of the engine 31 more generally.

The engine 31 comprises a crankcase 35 and a cylinder head (not visible) incorporating a combustion chamber, as well as an exhaust outlet (not shown) from which exhaust is discharged from the combustion chamber. The exhaust outlet is bounded by a mounting face to which a compact muffler 40 is connected (as best seen in FIG. 2).

The crankcase 35 is mounted within the fuselage 11 by way of an engine mounting assembly (not shown). The cylinder head is accommodated within a laterally protruding shroud 43 which also incorporates an engine air intake.

Referring now to FIGS. 3 to 8, the muffler 40 comprises a body 51 having a first end section 53 and a second end section 55. The body 51 is elongate, having a longitudinal extent between the first and second end sections 53, 55. The body 51 is configured as a casing 57 defining an interior chamber 60. The casing 57 presents an outer surface 59 which is not curved in the arrangement shown. The body 51 could however be arcuate along its longitudinal extent between the two end sections 53, 55. The curvature of the outer surface 59 in such a scenario may conform generally to the cross-sectional curvature of the exterior surface 23 of the rear end section 11a of the fuselage 11.

Figure 3:
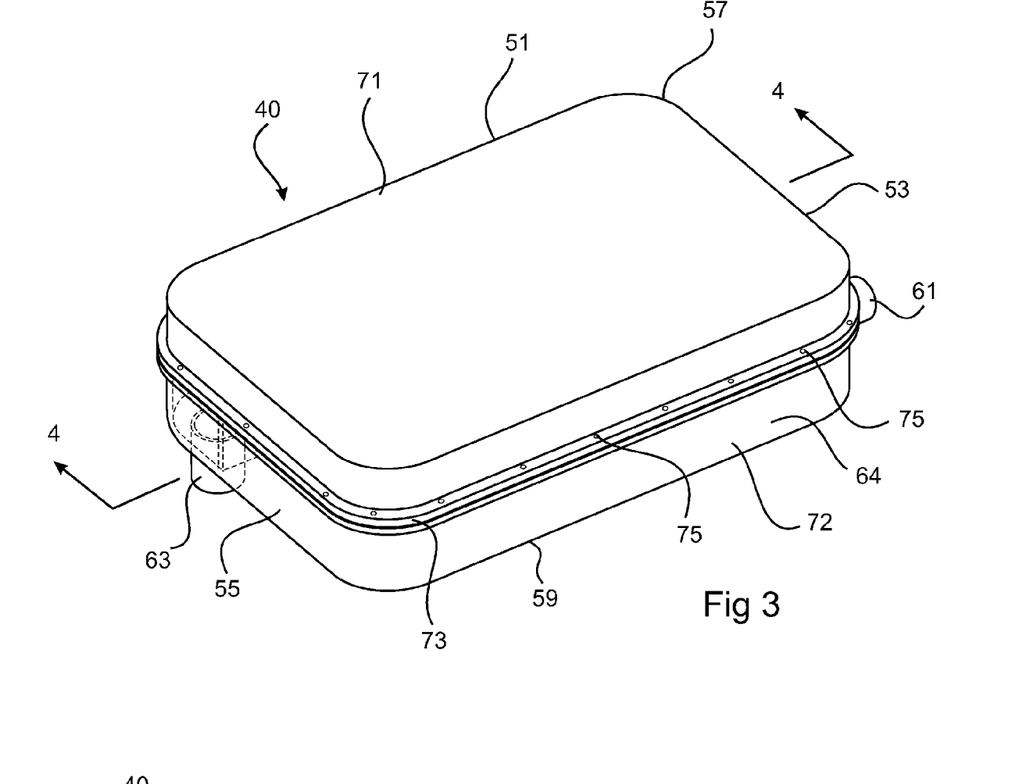
FIG. 3 is a schematic perspective view of a compact muffler for the engine system of the UAV as shown in FIG. 2.
Figure 4:
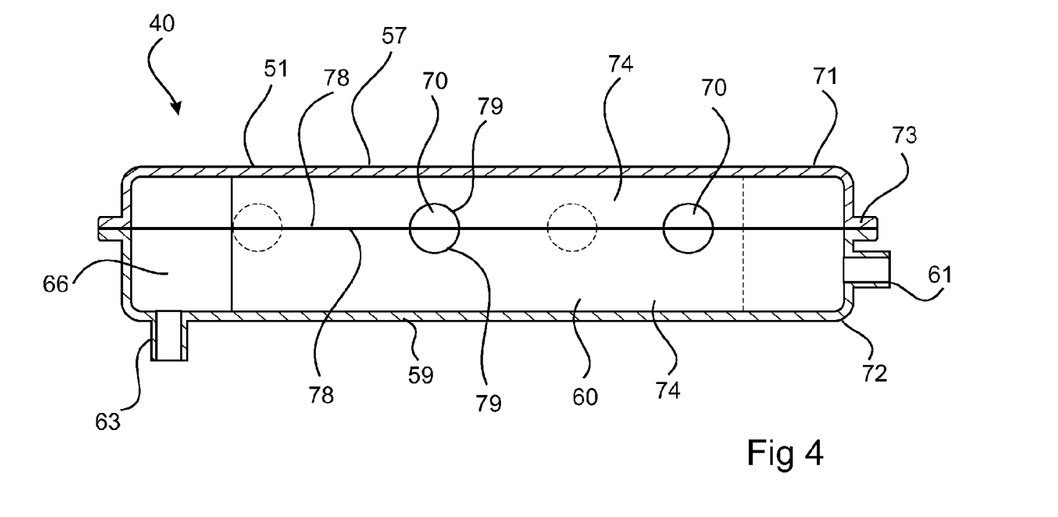
FIG. 4 is a section on line 4-4 of FIG. 3.

The muffler body 51 has an inlet 61 at the first end section 53 and an outlet 63 in the outer surface 59. The inlet 61 is bounded by a mounting face (not shown). The inlet 61 is adapted for communication with the exhaust outlet (not shown) of the engine 31 to deliver the exhaust into the interior chamber 60.

The casing 57 comprises a peripheral side wall 64 bounding the interior chamber 60.

Figure 7:
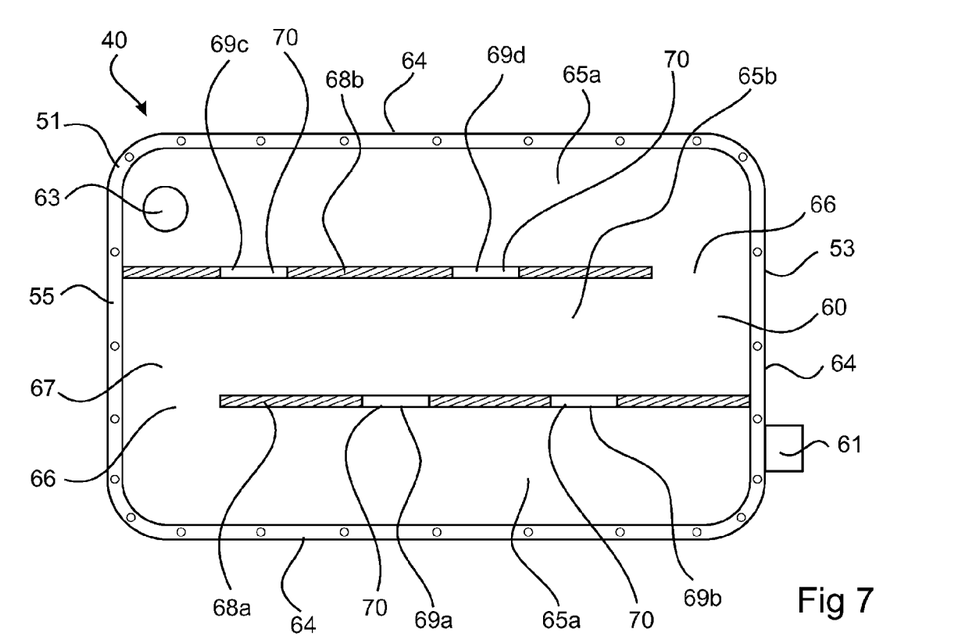
FIG. 7 is a schematic sectional plan view of the interior chamber of the muffler.

The interior chamber 60 accommodates a series of flow passages 65 which cooperate to provide a long exhaust flow path 67 (facilitated by the elongate profile of the muffler 40) with multiple directional changes from the inlet 61 to the outlet 63 at which the exhaust discharges to atmosphere. The flow passages 65 include two outermost passages 65a and an inner passage 65b. The inner passage 65b is defined between spaced-apart internal walls 68. The outermost passages 65a are defined between the peripheral side wall 64 and the adjacent internal walls 68.

In the arrangement shown, the internal walls 68 each terminate short of the peripheral wall 64 of the casing 57 to provide a gap 66 for fluid communication from one flow passage 65 to the next as part of the exhaust gas flow path 67.

One or both of the internal walls 68 incorporate openings 69 which define bypass passages 70, the purpose of which will be explained later.

In this embodiment, the muffler body 51 is configured as a shell of two-part construction, comprising first and second shell parts 71, 72 which are adapted to be assembled together to define the interior chamber 60 onto which the muffler inlet 61 and muffler outlet 63 each open.

The first and second shell parts 71, 72 have mating marginal edges adapted to abut and sealingly close the interior chamber 60. More particularly, the first and second shell parts 71, 72 are adapted to mate at parting line 73 and to be releasably fastened together by fasteners 75. The first and second shell parts 71, 72 have joining flanges 77 which abut at the parting line 73 and which are connected together by the fasteners 75. Each shell part 71, 72 defines a portion of the casing 57 and respective partition elements 74 (such as ribs) adapted to abut when the shell parts 71, 72 are assembled together to define the internal walls 68 within the interior chamber 60. The partition elements 74 (e.g. ribs) may be integrated in the shell parts 71, 72 or configured as detachable elements such as inserts. In the arrangement shown, there are two partition elements 74a and 74b, although of course the number of partition elements may be more or fewer than two.

The internal walls 68 are in spaced-apart relation to define the flow passages 65 within the interior chamber 60, as mentioned above.

The two shell parts 71, 72 are disposed in a side-by-side relationship, whereby the first part 71 constitutes an upper part and the second part 72 constitutes a corresponding lower part which defines the outer surface 59. Other arrangements are of course possible rather than a side-by-side relationship. For instance, the muffler body 51 may comprise two parts disposed in a radially inner and outer relationship, whereby the first part 71 constitutes an inner part and the second part 72 constitutes a corresponding outer part which defines the outer surface 59. In another arrangement, the muffler body 51 may be of one-piece construction; for example, manufactured by a 3D printing process.

Figure 5:
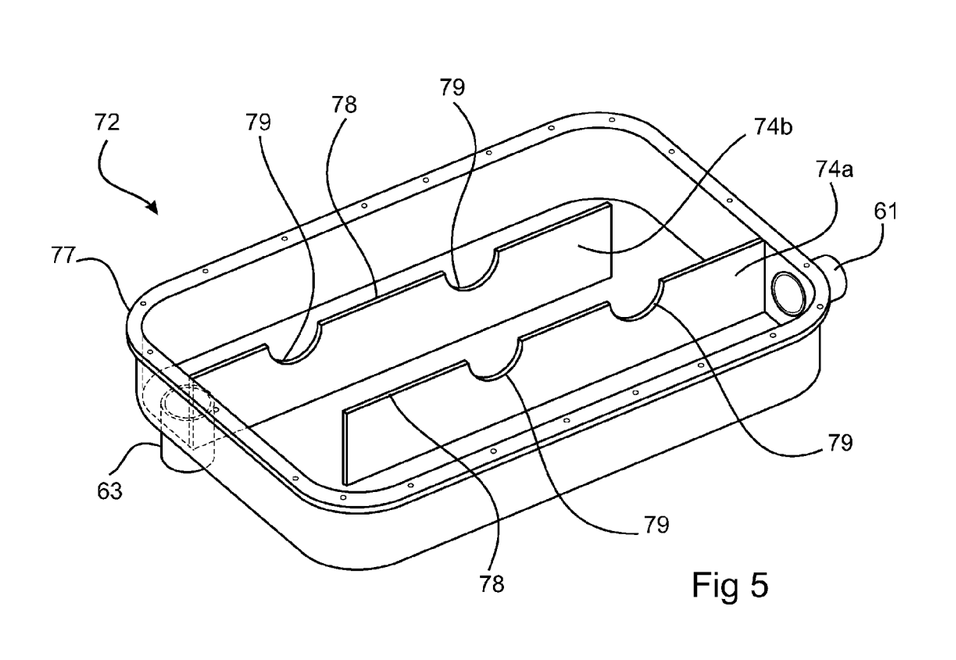
FIG. 5 is a schematic perspective view of a part of a shell which defines the muffler body, illustrating a portion of an interior chamber of the muffler.
Figure 6:
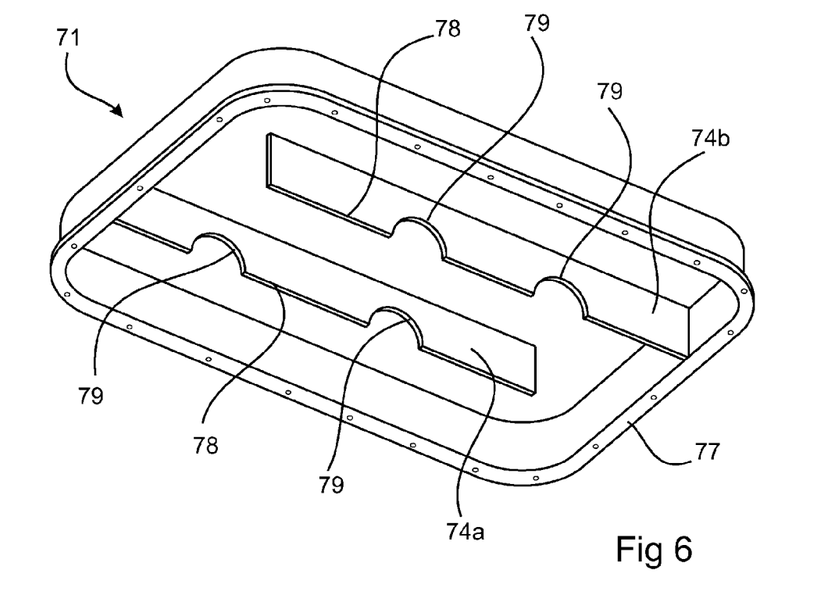
FIG. 6 is a schematic perspective view of a further part of a shell which defines the muffler body, illustrating a further portion of the interior chamber of the muffler.

Each partition element 74 (e.g. rib) has an edge 78 adapted to abut an edge of a counterpart partition element on the other shell part, as best seen in FIGS. 5 and 6. At least some of the partition elements 74 have recesses 79 which extend to the respective edges 78, whereby corresponding recesses 79 of abutting partition elements cooperate to define the openings 69 which constitute the bypass passages 70 when the two partition elements are in abutting relation, as best seen in FIG. 4.

In the arrangement shown in which the recesses 79 are semi-circular, the openings 69 accordingly comprise circular openings, although other configurations are contemplated, including for example square or rectangular openings and rounded slots.

It should be understood that the muffler body 51 need not necessarily be of two-part construction. Further, the internal walls 68 may take any appropriate form, and the openings 69 which define bypass passages 70 within the walls may be formed in any appropriate way (such as, for example, by machining or drilling).

The muffler 40 further comprises a first mount (not shown) for mounting the first end section 53 onto the engine 31 with the interior chamber 60 in communication with the exhaust outlet of the engine 31 to receive exhaust flow therefrom, and a second mount 82 for mounting the second end section 55 with respect to the engine 31. This mounting arrangement provides for a connection between the muffler 40 and the exhaust outlet of the engine 31, whereby exhaust flow from the exhaust outlet is delivered to the interior chamber 60 within the muffler body 51.

The muffler 40 is configured to be disposed crosswise within the fuselage 11, as best seen in FIG. 2. The muffler 40 is in a sense disposed in an underslung condition with respect to the engine 31, being mounted in position by way of the first and second mounts.

The muffler 40 may be so positioned that the outer surface 59, which may be curved in certain arrangements, is either coincident with the curved exterior surface 23 of the rear end section 11a of the fuselage 11 or recessed with respect to the curved exterior surface 23. In either case, the muffler 40 does not affect the aerodynamics of the fuselage 11 to any significant extent. This is particularly so as the outer surface 59 of the muffler 40 either sits inside of or conforms generally to the cross-sectional curvature of the exterior surface 23 of the rear end section 11a.

In the arrangement shown, the muffler 40 is so positioned with respect to the curved cover 27 that the outer surface 59 is recessed with respect to the curved exterior surface 23 of the rear end section 11a of the fuselage 11. As required, the cover 27 may also include an opening to accommodate the muffler outlet 63 so as to facilitate discharge of the engine exhaust gases to atmosphere.

The outer surface 59 of the muffler 40 corresponds with the underside of the cover 27 which in turn ensures continuity of the surface 23 of the rear end section 11a of the fuselage 11 (and thereby negating the significance of any adverse aerodynamics or drag that might otherwise arise from the presence of a disruption provided by the orientation of the muffler 40 if it were to protrude beyond the exterior surface 23, as is often the case with prior art UAV engine muffler arrangements).

In an embodiment where the muffler 40 has a curved elongate profile and the outer surface 59 is arranged coincident with the curved exterior surface 23 of the rear end section 11a of the fuselage 11 (i.e. effectively in place of the cover 27), such an arrangement would facilitate some of the air flowing along the exterior surface 23 of the rear end section 11a of the fuselage 11 to also provide some airflow over the curved outer surface 59 of the muffler 40. Such a feature whereby the curved outer surface 59 of the muffler 40 is exposed to airflow during motion of the UAV 10 may be further advantageous as it assists with cooling of the muffler 40.

Figure 8:
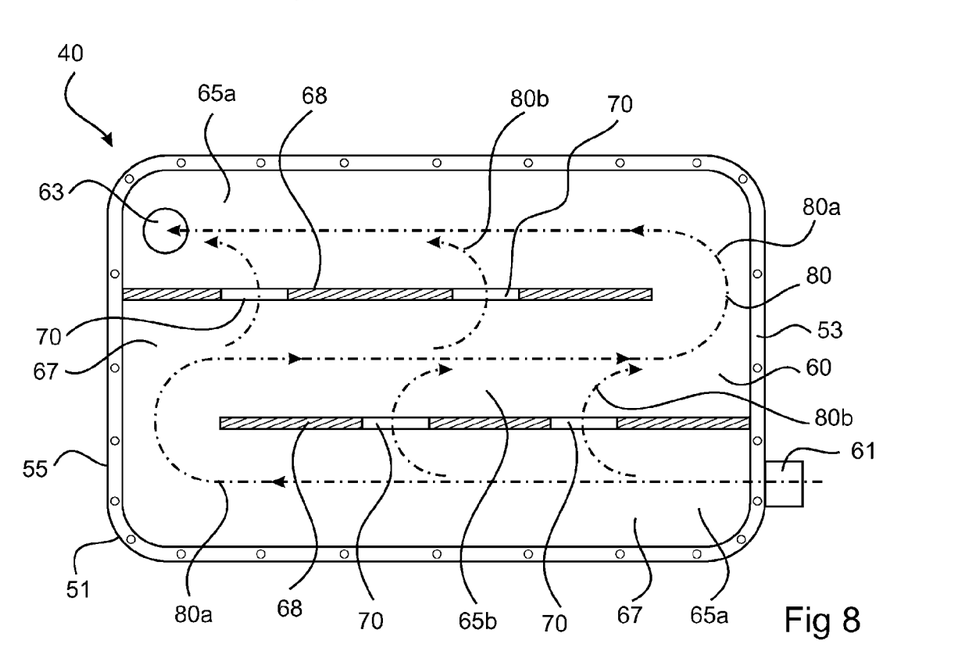
FIG. 8 is a view similar to FIG. 7 schematically depicting exhaust gas flow through the interior of the muffler from an inlet to an outlet.

As mentioned above, the exhaust gas flow path 67 within the muffler 40 comprises the series of flow passages 65 which are defined between spaced-apart internal walls 68, and at least some of the walls 68 incorporate openings 69 which define bypass passages 70. The bypass passages 70 open onto each respective flow passage 65 in a direction laterally of fluid flow along the respective flow passage 65.

In the embodiment shown, the exhaust gas flow path 67 is of tortuous configuration, with multiple directional changes between the inlet 61 and the outlet 63. The various flow passages 65 are fluidly connected in series and together provide an overall volume for the muffler 40. The flow passages 65 are disposed in side-by-side relation extending in the longitudinal direction of the muffler body 51 to provide the tortuous configuration of the exhaust gas flow path 67. With this arrangement, fluid flow along neighboring flow passages 65 is broadly in opposite directions. Furthermore, the muffler arrangement of the embodiment shown facilitates the provision of a long flow path by way of the series of flow passages 65 provided within the interior chamber 60, despite the overall muffler geometry being small and compact in nature.

The bypass passages 70 provide communication between each two neighbouring flow passages 65, promoting an equalisation of fluid pressure within those two passages and the exhaust gas flow path 67 overall.

In the case of the particular flow passage 65b which is bounded by two adjacent internal walls 68 each having openings 69 to provide flow passages 70, the locations of the openings 69 in the two adjacent walls 68 are offset. This can be best seen in FIGS. 7 and 8, where openings 69a, 69b in internal wall 68a are offset from openings 69c, 69d in internal wall 68b. This offsetting better facilities equalisation of fluid pressure within the flow passages 65 and the exhaust gas flow path 67 overall. For instance, the offsetting may assist in ensuring that sections of each flow passage 65 are not isolated from the pressure equalisation or unduly delayed in attaining the pressure equalisation state.

As a consequence of there being a plurality of the flow passages 65 and a plurality of the bypass passages 70, pressurisation of the overall volume of the compact muffler 40 provided by the series of flow passages 65 is able to occur more rapidly. With the bypass passages 70 promoting equalisation of fluid pressure within the various flow passages 65, the resulting mass of exhaust gas within the overall exhaust gas flow path 67 (i.e. within the overall muffler volume) is in effect a static gaseous body which is resiliently compressible and which is contained within the gas flow path 67.

Incoming exhaust gas entering the exhaust gas flow path 67 through the muffler inlet 61 confronts and integrates with the gaseous body, and a corresponding quantity of exhaust gas is displaced from the exhaust gas flow path 67, leaving the gaseous body and being discharged through the muffler outlet 63. However, because the gaseous body is resiliently compressible, it is able to expand and contract when subjected to engine exhaust pressure fluctuations, thereby acting as a damper to reduce acoustic pressure fluctuations in the exhaust gas flow and abate associated noise.

Exhaust gas flow between the inlet 61 and the outlet 63 is illustrated schematically in FIG. 8 by flow lines identified by reference numeral 80, with flow lines 80a representing the main flow along flow path 67 and flow lines 80b representing communication through the bypass passages 70.

It is notable that the bypass passages 70 function predominantly as pressure communication paths between the gas flow passages 65 (to facilitate pressure equalisation as discussed above), rather than as additional or supplementary gas flow passages. Indeed, preliminary investigations have indicated that exhaust gas flow though the bypass passages 70 would be no more than about 10% of the exhaust gas flow along the exhaust gas flow path 67.

Furthermore, preliminary investigations have indicated that a muffler according to the present embodiment provides a reduction in noise in the order of about 1.5 to 2.0 dB compared to essentially the same muffler without the feature of bypass passages 70. It is further believed that the reduction in noise could perhaps be in the order of about 2.5 to 3.0 dB. In practical terms, it is believed that the noise reduction achieved by a muffler according to the present embodiment is very significant and considered to be about half the level of what it might be for essentially the same muffler without the feature of bypass passages 70.

The openings 69 in the internal walls 68 within the interior chamber 60 defined by the casing 57 may also be conveniently arranged so as to facilitate the purging or drainage of any liquid that may enter or accumulate in one or more flow passages 65 of the muffler 40. More particularly with respect to two-stroke engines, it is sometimes the case that small quantities of oil are often short-circuited through the engine exhaust outlet port and into the exhaust system during certain engine operating conditions. If such oil remains resident within the casing 57 over longer periods of time it may cause unwanted build-up of carbonaceous deposits and potential blockages or partial blockages which may impact muffler performance and longer-term durability. Accordingly, where the openings 69 in the internal walls 68 are able to be arranged in a manner to take account of muffler orientation on the engine 31 and so be made to correspond with certain areas where any such oil is likely to collect during operation (i.e. and subsequently to be baked-on to the inner surfaces of the muffler 40), the specifically located openings 69 may further serve to facilitate the purging of any such oil from the muffler 40. Such fluid or oil purging would typically result as a consequence of the dynamic movement of gas through the flow passages 65 which in turn helps to urge the movement of any such liquids or oil through certain openings 69 and out through the exhaust outlet 63 during engine operation.

From the foregoing, it is evident that the present embodiment provides a simple yet highly effective way of enhancing noise reduction in exhaust gas discharged from the combustion chamber of an internal combustion engine with minimal effects on engine performance. The exhaust gas flow path 67 within the muffler 40 facilitates good exhaust tuning and engine performance benefits which remain important features of a small engine muffler of this type. Rapid pressurisation of the overall muffler volume (i.e. constituted by the overall exhaust gas flow path 67) owing to the presence of the bypass passages 70 then effectively serves to dampen pressure pulses in the exhaust gas discharged from the combustion chamber of the engine 31. That is, the compact muffler of the present invention facilitates the presence of a mass of gas within the series of flow passages 65 that is reluctant to move because of pressure equalisation rapidly achieved within the overall muffler volume (i.e. the volume within the interior chamber 60 defined by the series of passages 65). Put simply, it is believed that the muffler is not only filtering noise but also damping it quickly, operational features which are particularly important for a small compact muffler such as that described with particular applicability to small UAV engines.

While the embodiment has been described in conjunction with an engine system comprising an engine in the form of a small, single-cylinder reciprocating piston two-stroke engine for a UAV, which typically uses heavy fuel, it should be understood that the invention is not so limited. The invention may be used with any internal combustion engine as appropriate, including both two-stroke and four-stroke engines, and engines which use fuel other than heavy fuel.

The foregoing disclosure is intended to explain how to fashion and use the particular embodiments described, rather than to limit the true, intended, and fair scope and spirit of the present disclosure. The foregoing description is not intended to be exhaustive, nor to be limited to the precise forms disclosed.

It should be appreciated that various modifications can be made without departing from the principles described herein. Therefore, the principles should be understood to include all such modifications within its scope.

Features, integers, characteristics or groups described in conjunction with an aspect, embodiment or example of the invention are to be understood to be applicable to any other aspect, embodiment or example described herein unless incompatible therewith. All of the features disclosed in this specification (including any accompanying claims, abstract and drawings) may be combined in any combination, except combinations where at least some of such features are mutually exclusive. The invention is not restricted to the details of any foregoing embodiments. The invention extends to any novel one, or any novel combination, of the features disclosed in this specification (including any accompanying claims, abstract and drawings).

The method steps, processes, and operations described herein are not to be construed as necessarily requiring their performance in the particular order discussed or illustrated, unless specifically identified as an order of performance. It is also to be understood that additional or alternative steps may be employed.

The terminology used herein is for the purpose of describing particular example embodiments only and is not intended to be limiting.

As used herein, the singular forms "a", "an" and "the" may be intended to include the plural forms as well, unless the context clearly indicates otherwise.

Reference to any positional descriptions, such as "top", "bottom" and "side", are to be taken in context of the embodiments described and are not to be taken as limiting the invention to the literal interpretation of the term but rather as would be understood by the skilled addressee.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g. "between" versus "directly between," "adjacent" versus "directly adjacent," etc.). As used herein, the term "and/or" includes any and all combinations of one or more of the associated listed items.

Additionally, where the terms "system", "device", and "apparatus" are used in the context of the invention, they are to be understood as including reference to any group of functionally related or interacting, interrelated, interdependent or associated components or elements that may be located in proximity to, separate from, integrated with, or discrete from, each other.

Throughout this specification, unless the context requires otherwise, the word "comprise" or variations such as "comprises" or "comprising", will be understood to imply the inclusion of a stated integer or group of integers but not the exclusion of any other integer or group of integers.

Furthermore, throughout the specification and the claims that follow, unless the context requires otherwise, the word "include" or variations such as "includes" or "including", will be understood to imply the inclusion of a stated integer or group of integers but not the exclusion of any other integer or group of integers.

The invention claimed is:

1. A compact muffler for mounting to an engine exhaust system of a UAV, the compact muffler comprising a single interior chamber having a fixed volume, the interior chamber is in direct fluid communication with a muffler inlet and a muffler outlet, the interior chamber provides a single gas flow path extending between the muffler inlet and the muffler outlet whereby gas entering the chamber through the muffler inlet travels along the single gas flow path before exiting through the muffler outlet, wherein a casing provides a first internal wall and a second internal wall therein, the first internal wall extending from a portion of a first sidewall which is adjacent the muffler inlet and terminating a distance short of a second sidewall, the second sidewall being opposed to the first sidewall, the second internal wall extending from a portion of the second sidewall which is adjacent the muffler outlet and terminating a distance from the first sidewall, the first internal wall and second internal wall forming the single gas flow path whereby the single gas flow path comprises a plurality of adjacent flow passages, the plurality of adjacent flow passages being arranged so that the single gas flow path utilizes the entire volume provided by the chamber, wherein each internal wall incorporates at least one opening therein which defines at least one bypass passage between adjacent flow passages for further communication between the flow passages and to promote an equalization of fluid pressure within the adjacent passages; and wherein said muffler inlet is disposed in a first vertical plane and said at least one bypass passage is disposed in a second vertical plane extending substantially perpendicularly to said first vertical plane.

2. The compact muffler according to claim 1 wherein the muffler inlet is orientated such that the exhaust gas from the engine enters the chamber in a direction which substantially aligns with the longitudinal extent of a first flow passage of the plurality of flow passages.

3. The compact muffler according to claim 1 wherein each of the plurality of flow passages extends across the length or the width of the chamber.

4. The compact muffler according to claim 1 wherein the at least one internal wall extends along a longitudinal extent of the casing.

5. The compact muffler according to claim 1 wherein the at least one bypass passage is configured to open onto a respective flow passage in a direction laterally of fluid flow along the respective flow passage.

6. The compact muffler according to claim 1 wherein each flow passage is bounded by at least one internal wall and each bypass passage opens onto a respective flow passage through the at least one internal wall.

7. The compact muffler according to claim 1 wherein two adjacent flow passages are disposed directly adjacent one another to provide neighboring flow passages.

8. The compact muffler according to claim 7 wherein the two neighboring flow passages are separated by a common internal wall, such that, when considering the flow direction of the exhaust gas through the neighboring flow passages the bypass passage between the two neighboring flow passages opens laterally at one end onto one of the flow passages and opens laterally at an opposed end onto the other flow passage.

9. The compact muffler according to claim 1 further comprising at least one further opening to provide at least one further bypass passage between the two adjacent flow passages for further communication between the two flow passages.

10. The compact muffler according to claim 9 wherein the bypass passages are spaced at intervals along the common internal wall between the two adjacent passages.

11. The compact muffler according to claim 1 wherein the exhaust gas flow path comprises three or more of the flow passages fluidly connected in series.

12. The compact muffler according to claim 11 wherein the flow passages are arranged in pairs such that there is at least one of the bypass passages between the two flow passages in each pair.

13. The compact muffler according to claim 1 wherein the exhaust gas flow path comprises a first flow passage with which the inlet communicates, and a plurality of further flow passages arranged in series with the first flow passage, wherein there are bypass passages associated with all adjacent flow passages.

14. The compact muffler according to claim 5 wherein two adjacent internal walls defining a respective flow passage therebetween each has one or more openings to provide bypass passages, wherein the locations of the openings providing the bypass passages in the two internal walls are offset.

15. The compact muffler according to claim 1 wherein the casing is configured as a shell having a two-part construction.

16. The compact muffler according to claim 15 wherein the shell comprises first and second shell parts adapted to be assembled together to define the interior chamber into which the muffler inlet and muffler outlet each directly open.

17. The compact muffler according to claim 16 wherein either one or both of the first and second shell parts incorporate partition elements to define the internal walls within the interior chamber, the internal walls being in spaced apart relation to define the flow passages therebetween.

18. The compact muffler according to claim 15 wherein each partition element on one shell part has an edge adapted to abut an edge of a counterpart partition element on the other shell part, with the two partition elements having recesses which extend to the respective edges, whereby the two recesses cooperate to provide the opening which defines the respective bypass passage when the two partition elements are in abutting relation.

19. The compact muffler according to claim 16 wherein the casing has a first end section and a second end section, the first end section being adapted for mounting onto an engine with the interior chamber in communication with an exhaust outlet of the engine to directly receive exhaust flow therefrom.

20. The compact muffler according to claim 18 further comprising a muffler body that has an elongated shape and has a longitudinal extent measured between the first and second end sections.

21. The compact muffler according to claim 1 whereby in use, no less than 90% of the exhaust gases which enters the muffler travels along the exhaust gas flow path without passing through the bypass passage.

22. An internal combustion engine fitted with an exhaust system comprising a compact muffler according to claim 1.

23. A UAV comprising a fuselage presenting an exterior surface, and an internal combustion engine fitted with an exhaust system comprising a compact muffler, wherein the compact muffler presents an outer surface coincident with or recessed with respect to the exterior surface of the fuselage, and wherein the compact muffler is in accordance with claim 1.

* * * * *